(12) United States Patent
Haneda et al.

(10) Patent No.: US 8,638,374 B2
(45) Date of Patent: Jan. 28, 2014

(54) IMAGE PICKUP APPARATUS, IMAGE PICKUP SYSTEM, AND IMAGE PICKUP METHOD

(75) Inventors: Kazuhiro Haneda, Hachioji (JP); Makoto Ikeda, Kunitachi (JP)

(73) Assignee: Olympus Imaging Corp., Tokyo (JP)

( * ) Notice: Subject to any disclaimer, the term of this patent is extended or adjusted under 35 U.S.C. 154(b) by 317 days.

(21) Appl. No.: 13/070,229

(22) Filed: Mar. 23, 2011

(65) Prior Publication Data

US 2011/0242368 A1    Oct. 6, 2011

(30) Foreign Application Priority Data

Mar. 30, 2010    (JP) .................. 2010-079077

(51) Int. Cl.
- *H04N 5/235* (2006.01)
- *H04N 9/07* (2006.01)
- *H04N 3/14* (2006.01)
- *H04N 5/335* (2011.01)

(52) U.S. Cl.
USPC ............... 348/230.1; 348/229.1; 348/266; 348/297

(58) Field of Classification Search
USPC ........ 348/222.1, 229.1, 230.1, 234–238, 266, 348/267, 272, 294–297
See application file for complete search history.

(56) References Cited

U.S. PATENT DOCUMENTS

| | | | | |
|---|---|---|---|---|
| 5,455,621 A | * | 10/1995 | Morimura ................ | 348/229.1 |
| 5,990,952 A | * | 11/1999 | Hamasaki ................ | 348/311 |
| 6,219,097 B1 | * | 4/2001 | Kamishima et al. ......... | 348/297 |
| 6,248,133 B1 | * | 6/2001 | Komobuchi et al. ......... | 348/315 |
| 6,587,149 B1 | * | 7/2003 | Yoneyama et al. .......... | 348/362 |
| 6,771,312 B2 | * | 8/2004 | Kamishima et al. ........ | 348/229.1 |
| 6,903,770 B1 | * | 6/2005 | Kobayashi et al. .......... | 348/296 |
| 7,450,782 B2 | * | 11/2008 | Lim et al. .................. | 382/284 |
| 8,023,004 B2 | * | 9/2011 | Asoma ..................... | 348/229.1 |
| 8,199,234 B2 | * | 6/2012 | Seo et al. .................. | 348/297 |
| 8,243,179 B2 | * | 8/2012 | Shoho et al. ............... | 348/312 |
| 8,264,595 B2 | * | 9/2012 | Sano et al. ................ | 348/362 |
| 8,334,498 B2 | * | 12/2012 | Kanbe ..................... | 250/214.1 |

(Continued)

FOREIGN PATENT DOCUMENTS

| | | |
|---|---|---|
| CN | 1592361 | 3/2005 |
| CN | 101507262 | 8/2009 |

(Continued)

OTHER PUBLICATIONS

First Office Action for Chinese Patent Application No. 201110043648.3, mailed Dec. 26, 2012 (6 pgs.).

(Continued)

*Primary Examiner* — Chia-Wei A Chen
(74) *Attorney, Agent, or Firm* — John C. Pokotylo; Straub & Pokotylo (57) ABSTRACT

This invention provides an image pickup apparatus that performs an image pickup operation that alternately repeats a long exposure LE and a short exposure SE. The image pickup apparatus drives an image pickup device in a first driving mode that makes a first time interval between an exposure end time of a pixel in an SE and an exposure start time of the pixel in an LE immediately thereafter and a second time interval between the exposure end time of the pixel in the LE and the exposure start time of the pixel in the SE immediately thereafter equal.

9 Claims, 7 Drawing Sheets

(56) References Cited

U.S. PATENT DOCUMENTS

| | | | |
|---|---|---|---|
| 2001/0001245 A1* | 5/2001 | Kamishima et al. | 348/229 |
| 2005/0046708 A1* | 3/2005 | Lim et al. | 348/231.6 |
| 2005/0162529 A1* | 7/2005 | Nakasuji et al. | 348/222.1 |
| 2006/0119726 A1* | 6/2006 | Oda et al. | 348/315 |
| 2007/0097240 A1* | 5/2007 | Egawa et al. | 348/308 |
| 2008/0151086 A1* | 6/2008 | Nakayama | 348/296 |
| 2008/0158398 A1* | 7/2008 | Yaffe et al. | 348/294 |
| 2009/0101914 A1* | 4/2009 | Hirotsu et al. | 257/72 |
| 2009/0153699 A1* | 6/2009 | Satoh et al. | 348/229.1 |
| 2009/0174792 A1* | 7/2009 | Kusaka et al. | 348/230.1 |
| 2009/0262215 A1* | 10/2009 | Sano et al. | 348/229.1 |
| 2009/0295959 A1* | 12/2009 | Shoho et al. | 348/294 |
| 2010/0220215 A1* | 9/2010 | Rubinstein et al. | 348/231.99 |
| 2011/0134290 A1* | 6/2011 | Park et al. | 348/248 |
| 2011/0176040 A1* | 7/2011 | Ise | 348/294 |
| 2012/0057058 A1* | 3/2012 | Kakinuma et al. | 348/296 |

FOREIGN PATENT DOCUMENTS

| | | |
|---|---|---|
| JP | 07-095481 | 4/1995 |
| JP | 08-037626 | 2/1996 |
| JP | 2002-185864 | 6/2002 |
| JP | 2003-046857 | 2/2003 |
| JP | 2007-060449 | 3/2007 |

OTHER PUBLICATIONS

Office Action for Japanese Patent Application No. 2010-079077, mailed Jun. 18, 2013 (2 pgs.).

Office Action for Chinese Patent Application No. 201110043648.3, mailed Sep. 10, 2013 (10 pgs.).

* cited by examiner

IMAGE PICKUP APPARATUS, IMAGE PICKUP SYSTEM, AND IMAGE PICKUP METHOD

CROSS REFERENCE TO RELATED APPLICATION

This application claims benefit of Japanese Application No. 2010-79077 filed in Japan on Mar. 30, 2010, the contents of which are incorporated by this reference.

BACKGROUND OF THE INVENTION

1. Field of the Invention

The present invention relates to an image pickup apparatus, an image pickup system, and an image pickup method that perform an image pickup operation that can synthesize image data of a wide dynamic range by alternately repeating a long exposure and a short exposure.

2. Description of the Related Art

In recent years, digital cameras have been proposed and made commercially available that are configured to acquire two images of different exposure times by performing a short exposure (SE) and a long exposure (LE), and obtain a still image of a wide dynamic range by synthesizing the two images that are obtained.

Various devices have also been proposed in recent years for obtaining this kind of wide dynamic range image with respect to moving images.

For example, Japanese Patent Application Laid-Open Publication No. 2003-46857 discloses technology that synthesizes a wide dynamic range image from an image sequence for which the image pickup times have been varied between long and short times.

Figure 7:
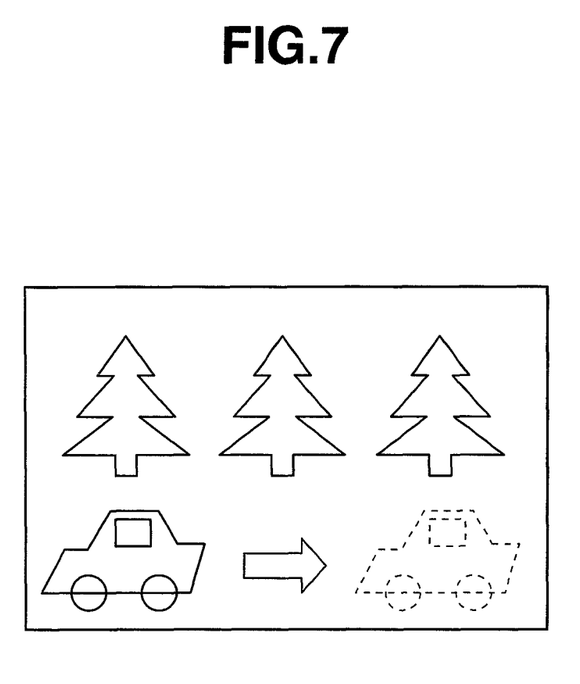
FIG. 7 is a view that illustrates an example of a moving object.
Figure 8:
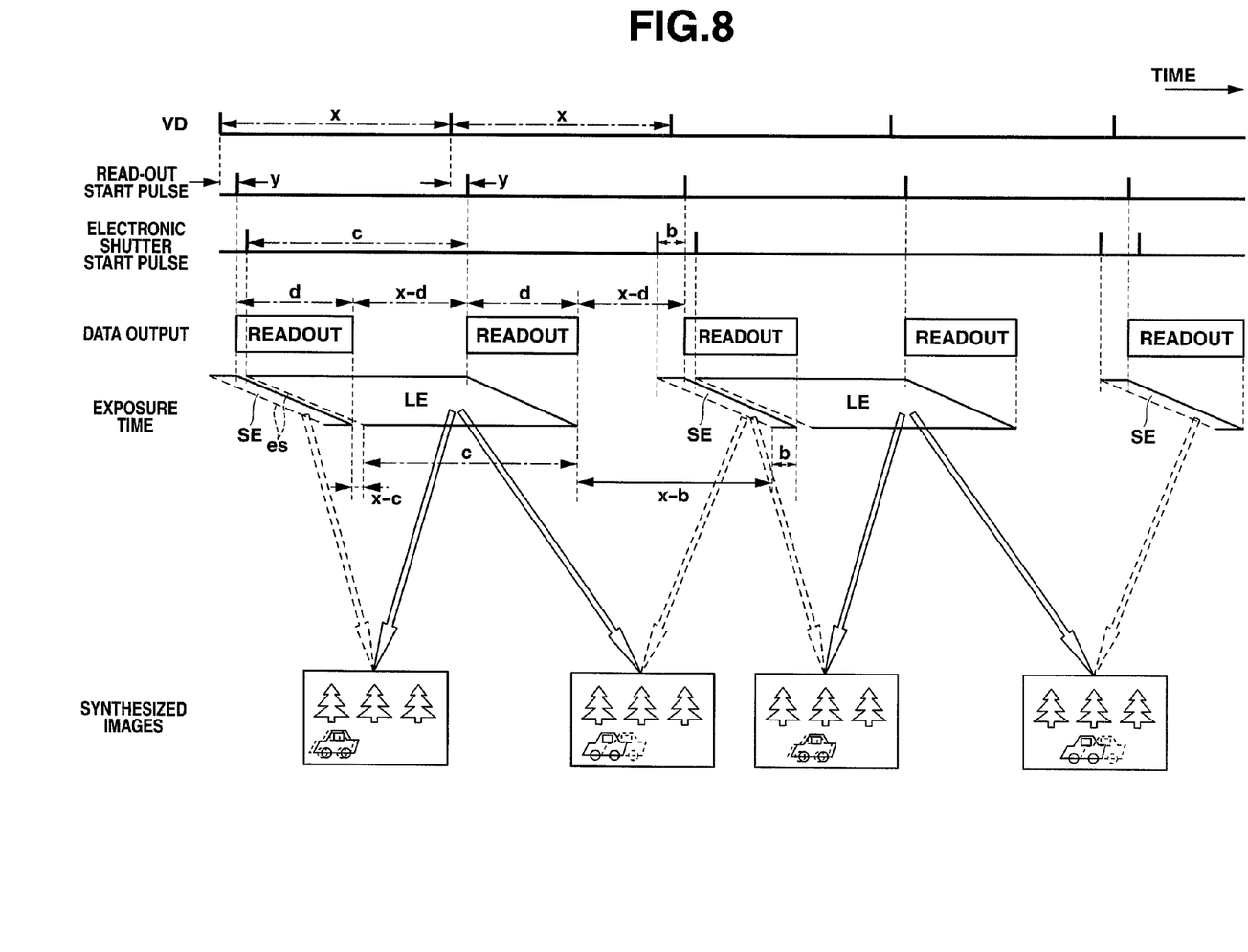
FIG. 8 is a timing chart that illustrates a state of respective signals when a wide dynamic range moving image is picked up according to the conventional technology and also according to a second driving mode of each embodiment of the present invention.

A flow of image pickup operations for acquiring such a conventional wide dynamic range moving image will now be described with reference to FIG. 7 and FIG. 8. FIG. 7 is a view that illustrates an example of a moving object. FIG. 8 is a timing chart that illustrates a state of respective signals when a wide dynamic range moving image is picked up.

A vertical synchronization signal VD that serves as a basis of an image pickup timing is outputted as a pulse for each fixed vertical synchronization period x.

With respect to both an SE image and an LE image, a read-out start pulse that defines a timing for reading out image data from an image pickup device is outputted after a previously set fixed time period y has elapsed after the vertical synchronization signal VD is outputted. When the read-out start pulse is outputted, sequential output of image data starts in order, for example, from a first line of the image pickup device. After a time d has elapsed after output of the read-out start pulse, image data of a last line is outputted and reading out of the image data ends.

Since an image read-out timing is previously determined in accordance with the vertical synchronization signal VD in this manner, control of the exposure time is performed by taking a time point that precedes the read-out timing by an amount of the exposure time as a running timing of an electronic shutter es. More specifically, an SE is performed by generating an electronic shutter start pulse at a time point that precedes the read-out start pulse by an amount of an SE time b (provided, b<x). Similarly, an LE is performed by generating the electronic shutter start pulse at a time point that precedes the read-out start pulse by the amount of an LE time c (provided, b≤c≤x).

When exposure is performed at such timings, with respect to an arbitrary line, an exposure interval time that is a time period from when an SE period ends until an LE period starts is x−c, and an exposure interval time that is a time period from when the LE period ends until the SE period starts is x−b, and thus the respective exposure interval times do not match.

Therefore, for example as shown in FIG. 7, in a case of obtaining a synthesized image at a frame rate corresponding to a cycle of the vertical synchronization signal VD by synthesizing an SE image and an LE image that are temporally adjacent when images of an object are picked up that moves at a constant speed from a left side of a screen to a right side against a motionless background, when simple addition or the like that has a small processing load is adopted as synthesis processing, as shown in FIG. 8, a movement amount of the object in the synthesized image is different for each frame and therefore movement of the object is observed as an unnatural motion that is not smooth.

On the other hand, when images are synthesized by performing a prediction operation or the like so as to come closer to a natural motion, not only does image processing itself become more complex, but a necessity also arises to make an image processing algorithm for synthesizing a temporally preceding SE image and a temporally succeeding LE image and the image processing algorithm for synthesizing a temporally preceding LE image and a temporally succeeding SE image different from each other, and thus the image processing becomes more complex and a processing load increases.

SUMMARY OF THE INVENTION

An object of the present invention is to provide an image pickup apparatus, an image pickup system, and an image pickup method that can perform an image pickup operation that can synthesize image data of a wide dynamic range with a natural motion without increasing an image processing load.

Briefly, an image pickup apparatus according to a first aspect of the present invention performs an image pickup operation that can synthesize image data of a wide dynamic range by alternately repeating a long exposure and a short exposure, and includes: an image pickup device in which a plurality of pixels are arranged; and a timing control portion that drives the image pickup device in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e.

An image pickup system according to a second aspect of the present invention includes the above described image pickup apparatus, and a synthesis processing portion that processes two pieces of image data obtained by a long exposure and a short exposure performed at timings that occur in succession by the image pickup apparatus and synthesizes image data of a wide dynamic range.

Further, an image pickup method according to a third aspect of the present invention performs an image pickup operation that can synthesize image data of a wide dynamic range by alternately repeating a long exposure and a short exposure, and includes: a step of performing a long exposure by means of an image pickup device in which a plurality of pixels are arranged; and a step of performing a short exposure by means of the image pickup device; wherein, by means of a timing control portion driving the image pickup device, the method alternately repeats the step of performing a long exposure and the step of performing a short exposure in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e.

The above and other objects, features and advantages of the invention will become more clearly understood from the following description referring to the accompanying drawings.

DETAILED DESCRIPTION OF THE PREFERRED EMBODIMENTS

Figure 1:
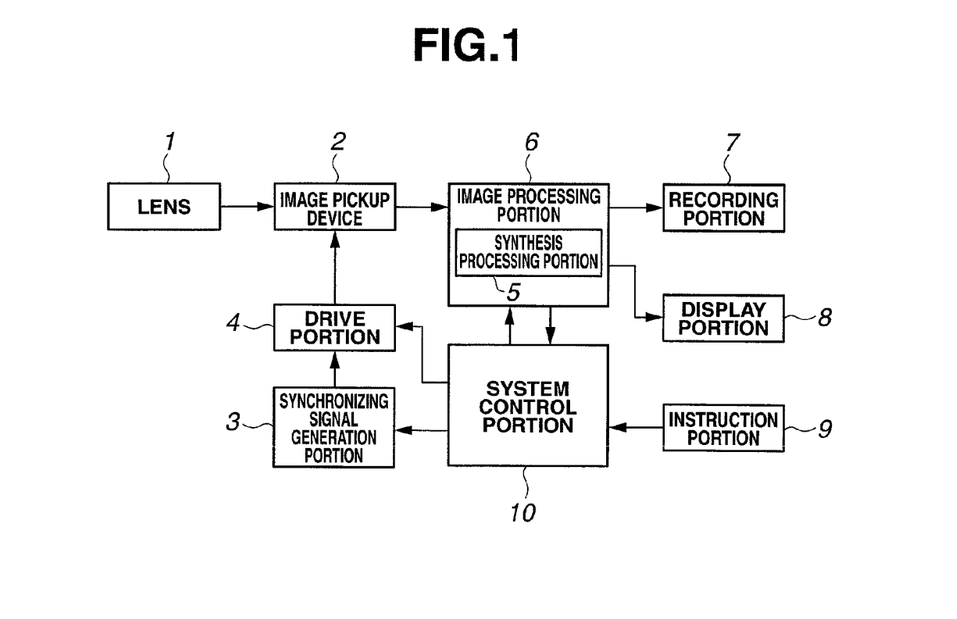
FIG. 1 is a block diagram that illustrates an example of the configuration of an image pickup apparatus according to Embodiment 1 of the present invention.

Embodiments of the present invention are described hereunder with reference to the drawings.
[Embodiment 1]
FIG. 1 to FIG. 4 illustrate Embodiment 1 of the present invention. FIG. 1 is a block diagram that illustrates an example of a configuration of an image pickup apparatus.

The image pickup apparatus shown in FIG. 1 includes a lens 1, an image pickup device 2, a synchronizing signal generation portion 3, a drive portion 4, a synthesis processing portion 5, an image processing portion 6, a recording portion 7, a display portion 8, an instruction portion 9, and a system control portion 10. Although a case where an image pickup apparatus is configured as a digital camera is described according to the present embodiment, the present invention is naturally not limited thereto, and the invention can be broadly applied to various devices that are equipped with functions that display moving images or shoot moving images, such as a digital video camera or a mobile phone with a shooting function.

The lens 1 is a shooting optical system for forming an optical object image on an image pickup surface of the image pickup device 2, and includes a diaphragm and a focus lens and the like.

The image pickup device 2 includes an image pickup surface on which a plurality of pixels are arranged. The image pickup device 2 photoelectrically converts an optical object image formed by the lens 1 to generate electrical image signals. The image pickup device 2 is configured to be able to sequentially reset pixels in pixel units or line units. An XY-address type image pickup device such as a CMOS image pickup device can be mentioned as a specific example of the image pickup device 2, although the present invention is not limited thereto.

The synchronizing signal generation portion 3 generates a vertical synchronization signal VD (see FIG. 3) under control of the system control portion 10.

The drive portion 4 generates a read-out start pulse or an electronic shutter start pulse to drive the image pickup device 2 based on the vertical synchronization signal VD generated by the synchronizing signal generation portion 3 under control of the system control portion 10.

The image processing portion 6 performs various kinds of image processing on image signals that are picked up by and read out from the image pickup device 2. The image processing portion 6 includes the synthesis processing portion 5. The synthesis processing portion 5 processes two pieces of image data obtained by a short exposure (SE) and a long exposure (LE) at timings that occur in succession among short exposures (SE) and long exposures (LE) that are repeatedly performed in an alternate manner, and thereby synthesizes image data of a wide dynamic range of a single frame with respect to each frame.

The recording portion 7 stores, in a non-volatile manner, data of images that have been shot and then processed for recording by the image processing portion 6. For example, the recording portion 7 is configured as a removable memory, such as a memory card, that can be taken out from the image pickup apparatus. Accordingly, the recording portion 7 need not be part of an inherent configuration of the image pickup apparatus.

The display portion 8 is a display device that displays images that have been shot and then processed for display by the image processing portion 6, or a menu relating to operation of the image pickup apparatus or the like.

The instruction portion 9 is a user interface for performing input operations with respect to the image pickup apparatus. The instruction portion 9 includes a power button for inputting an instruction to turn the power on or off, a photograph button for instructing a start of photographing, an image pickup mode setting button for setting the image pickup apparatus to a dynamic range enlargement image pickup mode, and various other setting buttons.

The system control portion 10 controls the entire image pickup apparatus based on instructions inputted by a user from the instruction portion 9 and information relating to an object whose image has been picked up that is obtained from the image processing portion 6 (for example, AF information, AE information, and information relating to a dynamic range of the object) and the like. For example, based on the AE information or the information relating to the dynamic range of the object, the system control portion 10 determines an SE time b and an LE time c (see FIG. 3 etc.), and controls the synchronizing signal generation portion 3, the drive portion 4 and the synthesis processing portion 5 to generate image data of a wide dynamic range. Further, the system control portion 10 is configured to be able to control the synchronizing signal generation portion 3 and the drive portion 4 so as to increase an image-pickup frame rate in order to acquire the AF information, the AE information and the like at a high speed when an instruction to photograph a still image is inputted from the instruction portion 9 while a live view (LV) is being displayed. Accordingly, the system control portion 10, the synchronizing signal generation portion 3, and the drive portion 4 constitute a timing control portion.

Figure 2:
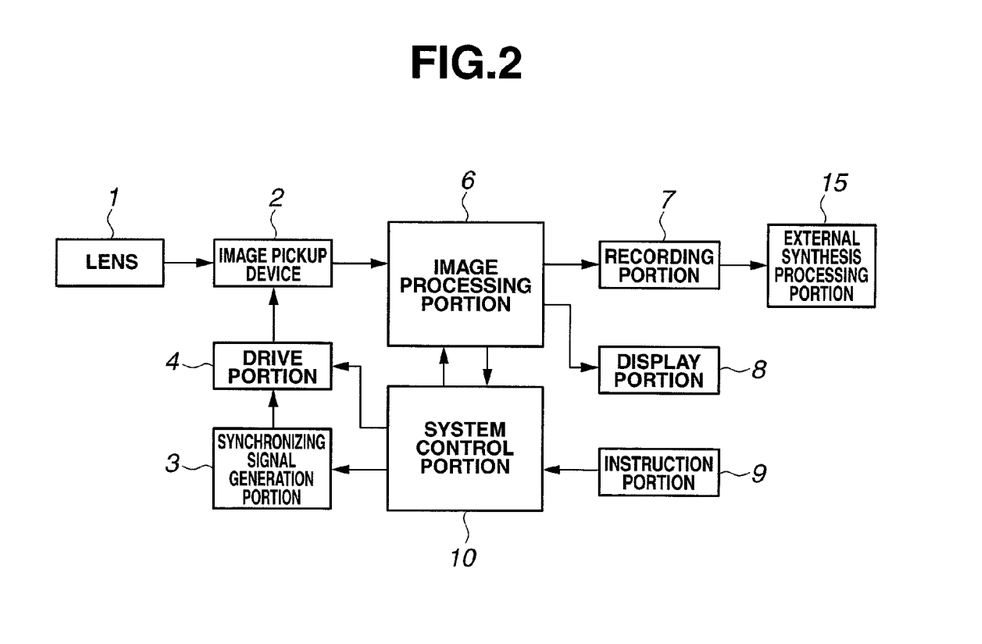
FIG. 2 is a block diagram that illustrates a configuration example of an image pickup system that combines the image pickup apparatus and an external synthesis processing portion according to Embodiment 1.

FIG. 2 is a block diagram that illustrates a configuration example of an image pickup system that combines the image pickup apparatus and an external synthesis processing portion.

In the configuration illustrated in FIG. 2, the synthesis processing portion is provided outside the image pickup apparatus instead of inside the image pickup apparatus.

More specifically, according to the configuration example shown in FIG. 2, the image processing portion 6 does not include the synthesis processing portion 5, and an external synthesis processing portion 15 is provided outside the image pickup apparatus. A computer that executes a synthesis processing program or the like may be mentioned as an example of the external synthesis processing portion 15.

Image data obtained by repeatedly performing an LE and an SE in an alternate manner is transferred to the external synthesis processing portion 15 via an unshown communication line or the recording portion 7 or the like. At the external synthesis processing portion 15, for each frame, two pieces of image data obtained by an SE and an LE performed at timings that occur in succession are processed to synthesize image data of a wide dynamic range of a single frame.

Figure 3:
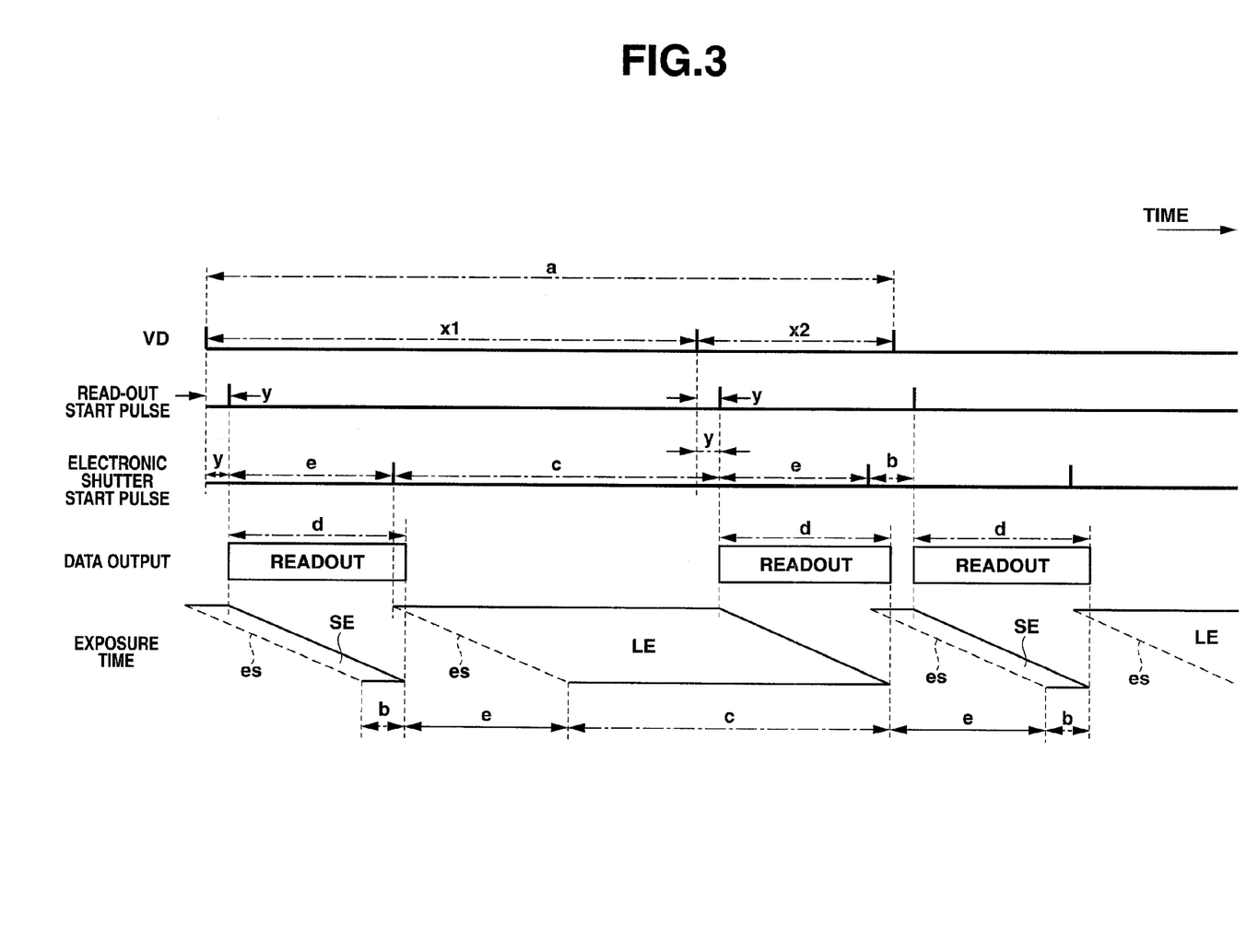
FIG. 3 is a timing chart that illustrates a state of respective signals when a wide dynamic range moving image is picked up in a first driving mode according to Embodiment 1.

FIG. 3 is a timing chart that illustrates a state of respective signals when a wide dynamic range moving image is picked up in a first driving mode.

In accordance with a situation, such as whether a normal LV is being displayed or whether it is a time of obtaining image pickup data in order to acquire the AF information and the AE information or the like at a high speed, the system control portion 10 sets the image-pickup frame rate that is the number of the vertical synchronization signals VD generated in a unit time. The image-pickup frame rate is also a frame rate of moving images that the image processing portion 6 generates. At this time, a total period (according to the present embodiment, a period obtained by adding together two different cycles of the vertical synchronization signals VD) of two consecutive vertical synchronization periods defined by three consecutive vertical synchronization signals VD that is a time period of two frames at the set image-pickup frame rate, more specifically, a time period in which the SE and the LE are each performed once, is taken as being represented by "a".

The system control portion 10 sets the SE time b and the LE time c under a limitation that b+c<a.

The system control portion 10 sets both a time from generation of the vertical synchronization signal VD until starting to read out a pixel signal in the SE (until generation of a read-out start pulse) and a time from generation of the vertical synchronization signal VD until starting to read out a pixel signal in the LE (until generation of a read-out start pulse) to a fixed time period y that is previously set as a positive value that is measurable in clock units.

Under this limitation, the system control portion 10 determines a time interval e that makes a first time interval between an exposure end time of a pixel in the SE and an exposure start time of the pixel in the LE immediately thereafter and a second time interval between the exposure end time of the pixel in the LE and an exposure start time of the pixel in the SE immediately thereafter equal based on the following equation 1.

$$e=(a-b-c)/2 \qquad \text{[Equation 1]}$$

In this connection, since the limitation b+c<a is imposed as described above, the time interval e (in practice, the time interval e is set to a positive value that is measurable in clock units) is guaranteed to be a positive value.

Further, the system control portion 10 sets a vertical synchronization period x1 relating to the LE as shown in the following equation 2.

$$x1=e+c=(a-b+c)/2 \qquad \text{[Equation 2]}$$

The system control portion 10 also sets a vertical synchronization period x2 relating to the SE as shown in the following equation 3.

$$x2=a-x1=(a+b-c)/2 \qquad \text{[Equation 3]}$$

As shown in FIG. 3, the system control portion 10 controls the synchronizing signal generation portion 3 so as to generate the vertical synchronization signals VD such that the vertical synchronization periods alternately become x1 and x2. The system control portion 10 also controls the drive portion 4 so as to generate a read-out start pulse at a time point at which the fixed time period y has elapsed after generating the vertical synchronization signal VD.

For example, as shown in FIG. 3, when the fixed time period y elapses after generation of a vertical synchronization signal VD that indicates a start timing of the vertical synchronization period x1, a read-out start pulse is generated from the drive portion 4 to thereby start readout of SE image data that, for example, is performed in order in line units (more specifically, an end of the SE is performed, for example, in order in line units). In this connection, a time point that precedes a time point at which the end of the SE is performed with respect to an initial line by the amount of the SE time b is a time point at which a start of the SE is performed with respect to the initial line (consequently, for an arbitrary line, a time point that precedes a time point at which readout of the SE image data is performed by the amount of an exposure time b is a time point at which an electronic shutter es operation is performed by means of a pixel reset operation as illustrated by a dashed line in FIG. 3). Further, a time period from the start of readout of image data until the end thereof differs depending on a readout speed of the image pickup device 2 and the number of lines that are read out and the like, and in this example the time period is denoted by reference character d.

Next, it is possible to start charge storage of an LE image with respect to a line for which readout of the SE image data has ended. Therefore, the system control portion 10 controls the drive portion 4 to generate an electronic shutter start pulse at a time point at which the above described time interval e has elapsed after a time point at which the read-out start pulse relating to the SE is generated. Running characteristics of the electronic shutter are previously set so as to match characteristics with respect to an image data readout. Hence, for an arbitrary line, at a time point at which the aforementioned time interval e has elapsed after readout of the SE image data has ended, the electronic shutter es operation is performed by means of a pixel reset operation for starting charge storage of the LE image.

Thereafter, when the fixed time period y elapses after generation of the vertical synchronization signal VD that indicates a start timing of the vertical synchronization period x2, a read-out start pulse is generated from the drive portion 4 and readout of LE image data is performed, for example, in order in line units. When the start and end of the LE is performed at such timings, the LE time is the aforementioned time c.

Subsequently, it is possible to start charge storage of an SE image with respect to a line for which reading out of LE image data has ended. Therefore, the system control portion 10 controls the drive portion 4 to generate an electronic shutter start pulse at a time point at which the above described time interval e elapses after a time point at which the read-out start pulse relating to the LE is generated. As a result, for an arbitrary line, at a time point at which the aforementioned time interval e elapses after readout of the LE image data has ended, the electronic shutter es operation is performed by means of a pixel reset operation for starting charge storage of the SE image.

Thereafter, when the fixed time period y elapses after generation of the vertical synchronization signal VD that indicates the start timing of the vertical synchronization period x1, a read-out start pulse is generated from the drive portion 4 and readout of the SE image data is, for example, performed in order in line units. When the start and end of the SE is performed at such timings, an SE time is the aforementioned time b.

Similarly thereafter, the image pickup device 2 is driven according to a timing control to generate the vertical synchronization signals VD so as to realize alternate vertical synchronization periods of x1 and x2, generate a read-out start pulse at a time point at which the fixed time period y elapses after the relevant vertical synchronization signal VD has been generated, and generate an electronic shutter start pulse at a time point at which the time interval e elapses after the read-out start pulse has been generated.

In addition to the first driving mode illustrated in FIG. 3, the image pickup apparatus of the present embodiment can also be driven in a second driving mode that is similar to a conventional driving mode as illustrated in FIG. 8. More specifically, the image pickup device 2 can also be driven in a second driving mode that satisfies both a limitation that a cycle of the vertical synchronization signal VD relating to the SE and a cycle of the vertical synchronization signal VD relating to the LE are both a constant cycle (vertical synchronization period x), and a limitation that a time period from generation of the vertical synchronization signal VD until starting readout of a signal of a pixel in the SE and a time period from generation of the vertical synchronization signal VD until starting readout of a signal of a pixel in the LE are both the fixed time period y that is previously set.

Figure 4:
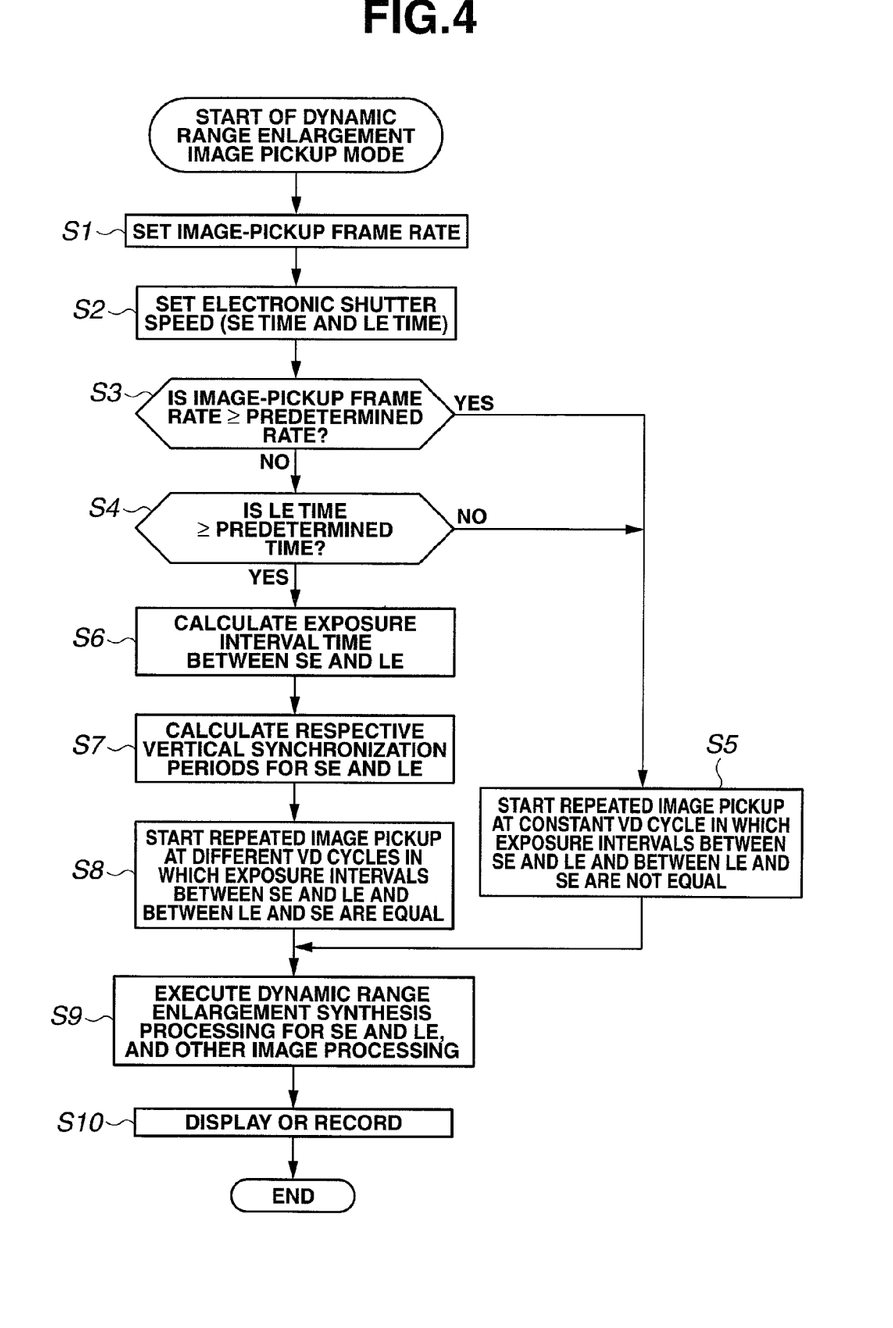
FIG. 4 is a flowchart that illustrates processing of the image pickup apparatus in a dynamic range enlargement image pickup mode according to Embodiment 1.

A flow of processing when a wide dynamic range moving image is picked up while two kinds of drive modes are appropriately used will now be described referring to FIG. 4. FIG. 4 is a flowchart that illustrates processing of the image pickup apparatus in a dynamic range enlargement image pickup mode.

The processing in the dynamic range enlargement image pickup mode begins when a user turns on the power by pressing the power button in a state in which the dynamic range enlargement image pickup mode is set, or when the user operates the image pickup mode setting button when the power is on and sets the dynamic range enlargement image pickup mode.

Thereupon, first, the system control portion 10 sets the image-pickup frame rate as described above (a vertical synchronization period corresponding to the image-pickup frame rate is an average vertical synchronization period a/2 as illustrated in FIG. 3 or the vertical synchronization period x illustrated in FIG. 8) (step S1).

Next, the system control portion 10 sets the SE time b and the LE time c based on the AE information and the information relating to the dynamic range of the object (step S2).

Subsequently, the system control portion 10 determines whether or not the image-pickup frame rate set in step S1 is greater than or equal to a predetermined rate that is previously set (step S3). In this case, the present applicant found as a result of experiment that when the image-pickup frame rate is, for example, 120 fps or more, even when the image pickup device 2 is driven in the second driving mode as illustrated in FIG. 8, more specifically, even when the first time interval between the exposure end time of the SE and the exposure start time of the LE immediately thereafter and the second time interval between the exposure end time of the LE and the exposure start time of the SE immediately thereafter are not equal, unnaturalness of a wide dynamic range moving image that is synthesized is inconspicuous. Therefore, when the image pickup device 2 is driven in the second driving mode, the predetermined rate is a threshold value which determines whether the unnaturalness of the wide dynamic range moving image that is synthesized is conspicuous or inconspicuous, and one example of the value thereof is the aforementioned 120 fps.

In this case, when the image-pickup frame rate is less than the predetermined rate, the system control portion 10 also determines whether or not the LE time c that is set in step S2 is greater than or equal to a predetermined time that is previously set (step S4).

The reason for performing this determination will now be described taking as an example a case where a ratio between the SE time b and the LE time c is 1:4. For example, in a case where c=0.9x and b=0.225x, when the image pickup device 2 is driven in the second driving mode as illustrated in FIG. 8, the first time interval is x−c=0.1x and the second time interval is x−b=0.775x. Therefore, the ratio between the first time interval and the second time interval is 1:7.75, and thus the first time interval differs significantly from the second time interval.

In contrast, when the LE time c is small, for example, in a case where c=0.2x and b=0.05x, the first time interval is x−c=0.8x and the second time interval is x−b=0.995x. Therefore, the ratio between the first time interval and the second time interval is 1:1.24, and there is little difference between the two intervals, and it is thus considered that the unnaturalness of the wide dynamic range moving image that is synthesized will be inconspicuous.

Therefore, a predetermined time used for the determination is set to a threshold value that determines whether the unnaturalness of the wide dynamic range moving image that is synthesized is conspicuous or inconspicuous when the image pickup device 2 is driven in the second driving mode. The predetermined time can also be expressed as a proportion (that takes a value less than 1) with respect to the vertical synchronization period x. Accordingly, instead of determining whether or not the LE time c is greater than or equal to a predetermined time, a configuration may be adopted that determines whether or not the LE time c is greater than or equal to a predetermined proportion of the vertical synchronization period x.

If the image-pickup frame rate is greater than or equal to the predetermined rate in the aforementioned step S3, or if the LE time is less than the predetermined time in the aforementioned step S4, the system control portion 10 executes control so as to drive the image pickup device 2 according to the second driving mode, and picks up images repeatedly at a fixed VD cycle in which the exposure intervals between an SE and a following LE and between an LE and a following SE are not equal as illustrated in FIG. 8 (step S5).

In contrast, if the image-pickup frame rate is less than the predetermined rate in the aforementioned step S3 and the LE time is greater than or equal to the predetermined time in the aforementioned step S4, the system control portion 10 calculates the time interval e between the SE and the LE as shown in the above Equation 1 based on the image-pickup frame rate set in step S1 (and, by extension, the total period a of two consecutive vertical synchronization periods) and the SE time b and the LE time c that are set in step S2 (step S6). In this connection, although an example is described here in which the system control portion 10 performs a calculation based on Equation 1, the present embodiment is not limited to performing a calculation to determine the time interval e, and for example a configuration may be adopted in which the time interval e is determined by referring to a table.

Next, the system control portion 10 calculates the vertical synchronization period x1 relating to the LE and the vertical synchronization period x2 relating to the SE as illustrated in the above described equations 2 and 3, respectively (step S7).

Subsequently, the system control portion 10 executes control so as to drive the image pickup device 2 according to the first driving mode, and picks up images repeatedly at different VD cycles in which the exposure intervals between an SE and a following LE and between an LE and a following SE are equal as illustrated in FIG. 3 (step S8).

When the processing in step S5 or step S8 is performed and the SE image and the LE image are repeatedly outputted, in a case of a configuration shown in FIG. 1, the synthesis processing portion 5 processes two pieces of image data obtained by the SE and the LE at timings that occur in succession, and performs processing that synthesizes image data of a wide dynamic range. The image processing portion 6 also performs other image processing (step S9).

The image data of the wide dynamic range that is synthesized is then displayed on the display portion 8 or recorded in the recording portion 7 (step S10), and when image data of all frames has been processed, the processing ends.

In a case of a configuration shown in FIG. 2, at least the processing that synthesizes image data of the wide dynamic range in step S9 is omitted, and the LE image data and the SE image data are each recorded in the recording portion 7 in the processing in step S10. Subsequently, the data recorded in the recording portion 7 is read by the external synthesis processing portion 15, and the external synthesis processing portion 15 performs the processing that has been omitted in step S9, that is, processing that synthesizes image data of the wide dynamic range and the like.

According to Embodiment 1 as described above, since central time points (time axis position of a center of gravity position of a rhomboid region denoted by reference characters SE in FIG. 3) of exposure times of short exposures and central time points (time axis position of a center of gravity position of a rhomboid region denoted by reference characters LE in FIG. 3) of exposure times of long exposure are evenly dispersed in a time axis direction, it is possible to perform an image pickup operation that can synthesize image data of the wide dynamic range of a natural motion without increasing the image processing load.

Further, since driving signals of the image pickup device 2, that is, a read-out start pulse and an electronic shutter start pulse, can be generated based on the vertical synchronization signal VD, it is possible to simplify a configuration of a circuit for pulse generation in the drive portion 4 and simplify control of the drive portion 4. In addition, with respect to both the LE image and the SE image, since readout of image data is started at a time point at which a fixed time period has elapsed after generation of the vertical synchronization signal VD, there is the advantage that timing control of the image processing portion 6 is also simplified.

Furthermore, since the image pickup device is driven in the second driving mode when the image-pickup frame rate is equal to or greater than a predetermined frame rate (for example, 120 fps), or when the exposure time of the long exposure is less than a predetermined time (when the exposure time is less than a predetermined proportion of the vertical synchronization period), the vertical synchronization signal VD can also be made a constant cycle. Hence, control of the synchronizing signal generation portion 3 can be further simplified without making the unnaturalness of the wide dynamic range moving image that is synthesized conspicuous.

[Embodiment 2]

Figure 5:
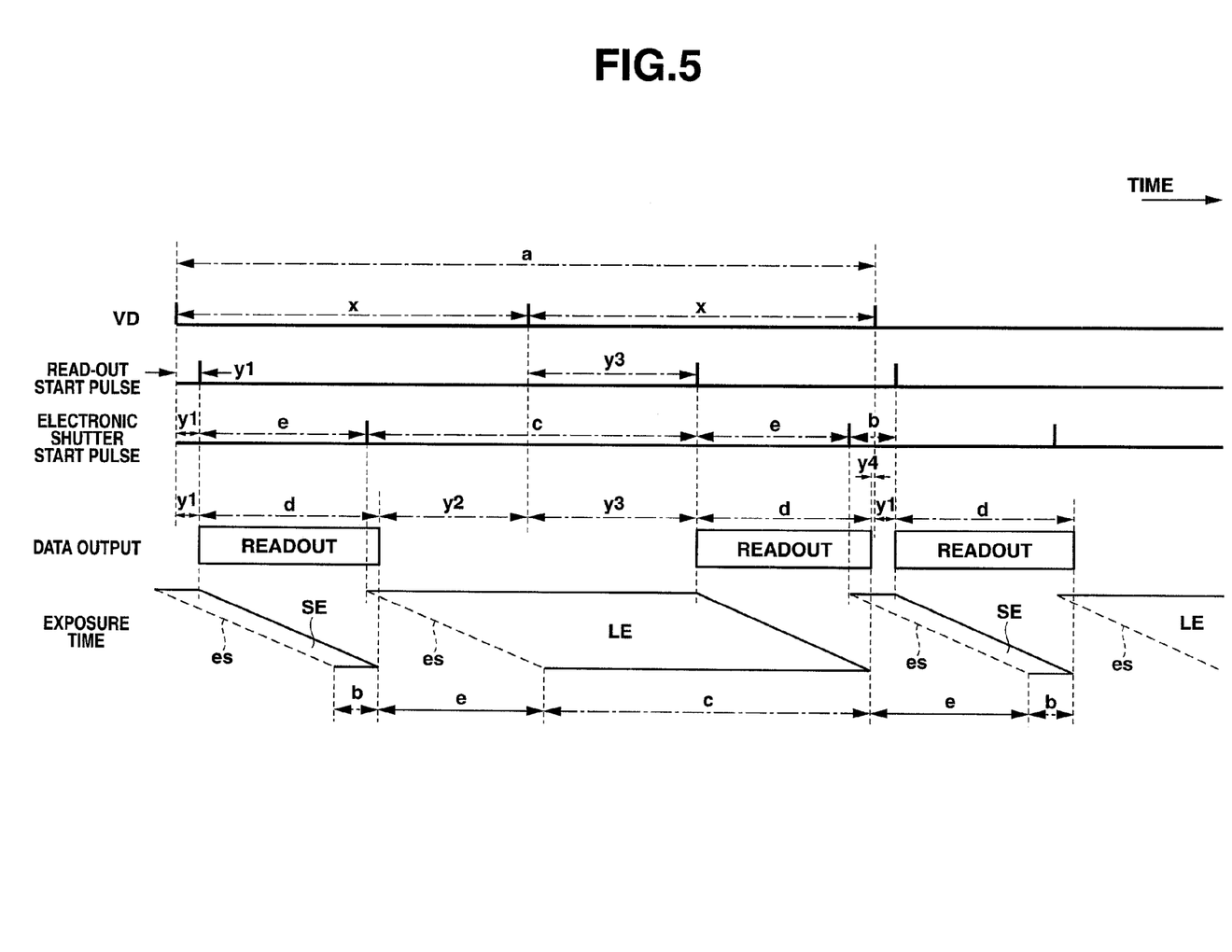
FIG. 5 is a timing chart that illustrates a state of respective signals when a wide dynamic range moving image is picked up in a first driving mode according to Embodiment 2.
Figure 6:
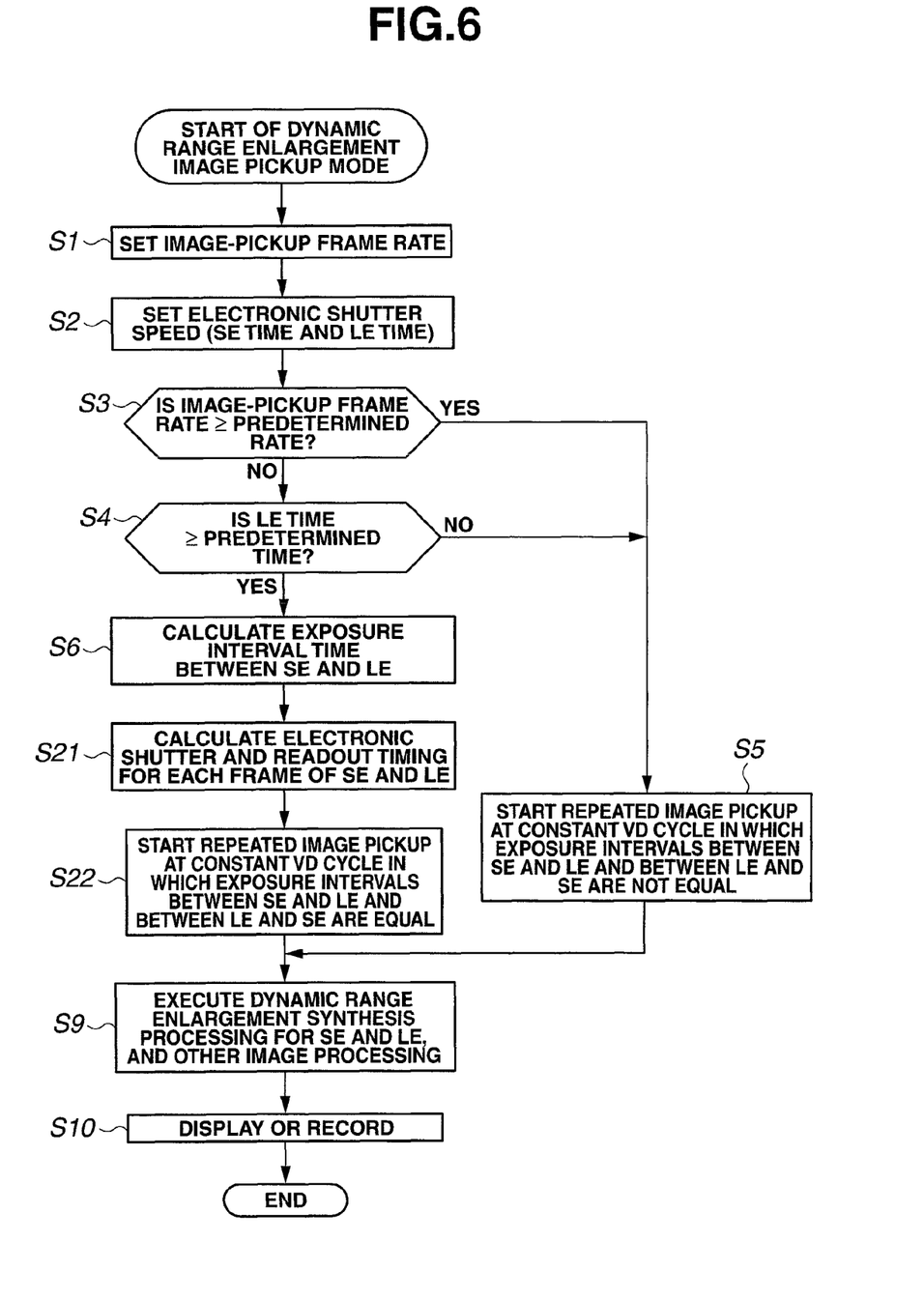
FIG. 6 is a flowchart that illustrates processing of the image pickup apparatus in a dynamic range enlargement image pickup mode according to Embodiment 2.

FIG. 5 and FIG. 6 illustrate Embodiment 2 of the present invention. FIG. 5 is a timing chart that illustrates a state of respective signals when a wide dynamic range moving image is picked up in a first driving mode. FIG. 6 is a flowchart that illustrates processing of an image pickup apparatus in a dynamic range enlargement image pickup mode. In the following description of Embodiment 2, components that are the same as in the foregoing Embodiment 1 are denoted by like reference numerals and a description of such components is omitted, and mainly only differences with respect to Embodiment 1 are described.

In the aforementioned Embodiment 1, a configuration is adopted that makes a first time interval between an SE end time and an LE start time and a second time interval between an LE end time and an SE start time equally a time interval e by changing a generation timing of a vertical synchronization signal VD while a time from generation of the vertical synchronization signal VD until generation of a read-out start pulse is kept constant. In contrast, according to Embodiment 2, a configuration is adopted that makes the first time interval and the second time interval equally the time interval e by controlling a time from generation of the vertical synchronization signal VD until the start of readout of a signal of a pixel in an SE and a time from generation of the vertical synchronization signal VD until the start of readout of a signal of a pixel in an LE while a cycle of the vertical synchronization signal VD is made a constant cycle.

A configuration of the image pickup apparatus and an image pickup system of the present embodiment are the same as the configurations illustrated in FIG. 1 and FIG. 2 according to Embodiment 1 as described above.

A system control portion 10 sets both a vertical synchronization period relating to the LE and a vertical synchronization period relating to the SE to a same value x (and therefore makes a total period a of two consecutive vertical synchronization periods equal to 2x), and sets an SE time b and an LE time c in a same manner as in the foregoing Embodiment 1.

Under a limitation that a cycle of the vertical synchronization signal VD is made a constant cycle, based on the aforementioned Equation 1, the system control portion 10 determines the time interval e that makes the first time interval between the exposure end time of a pixel in the SE and the exposure start time of the pixel in the LE immediately thereafter and the second time interval between the exposure end time of the pixel in the LE and the exposure start time of the pixel in the SE immediately thereafter equal.

Further, the system control portion 10 sets a time from generation of the vertical synchronization signal VD until the start of readout of the signal of the pixel in the SE to a predetermined time y1 that is previously set, and sets a time y3 from generation of the vertical synchronization signal VD until the start of readout of the signal of the pixel in the LE in a manner shown in the following Equation 4.

$$y3 = y1 + e + c - x \qquad \text{[Equation 4]}$$

However, it is necessary to set y1 and y3 so that both a time y2 from an end of readout of an SE image until generation of a next vertical synchronization signal VD and a time y4 from the end of readout of an LE image until generation of the next vertical synchronization signal VD both become positive values (more preferably, values that are greater than or equal to a certain positive minimum value).

Subsequently, as shown in FIG. 5, the system control portion 10 controls a synchronizing signal generation portion 3 so as to generate the vertical synchronization signals VD so that the vertical synchronization periods are a constant period x. Further, the system control portion 10 controls a drive portion 4 so as to alternately generate a read-out start pulse when the predetermined time y1 has elapsed after the vertical synchronization signal VD relating to the SE has been generated, and generate a read-out start pulse when the time y3 has elapsed after the vertical synchronization signal VD relating to the LE has been generated. Further, with respect to both the SE and the LE, the system control portion 10 controls the drive portion 4 so as to generate an electronic shutter start pulse at a time point at which the time interval e elapses after the read-out start pulse has been generated, similarly to the above described Embodiment 1.

In this connection, although in the above description the time y3 is determined under a state in which y1 is previously set as a fixed time period, it is not impossible that, conversely thereto, the time y1 is determined under a state in which y3 is previously set as a fixed time period. However, as will be understood by referring to FIG. 5, a necessity to readjust each value or the like is liable to arise if, for example, y3 is set to a small value and y1 becomes a negative value. Hence, a method in which first y1 is set as the fixed time period that is a small value that is previously set as described above is preferable because it is easy to set each value.

The image pickup apparatus of the present embodiment also is capable of driving an image pickup device 2 in both the first driving mode illustrated in FIG. 5 and a second driving mode that is similar to a conventional technology as illustrated in FIG. 8. FIG. 6 is a flowchart that illustrates processing of the image pickup apparatus in the dynamic range enlargement image pickup mode.

In FIG. 6, processing from steps S1 to S6 is the same as the processing illustrated in FIG. 4.

Thereafter, the system control portion 10 sets the predetermined time y1 that indicates a readout timing relating to the SE, and also calculates the time y3 that indicates a readout timing relating to the LE by means of the above described Equation 4. At this time, the start of running of the electronic shutter es relating to the LE is a timing of y1+e that is an elapsed time after generation of the vertical synchronization signal VD, and the start of running of the electronic shutter es relating to the SE is a timing of elapsed time y3+e (step S21).

Subsequently, the system control portion 10 executes control so as to drive the image pickup device 2 in the first driving mode, and performs image pickup operations repeatedly at a constant VD cycle in which the exposure intervals between an SE and a following LE and between an LE and a following SE are equal as illustrated in FIG. 5 (step S22).

The processing of step S9 and step S10 performed after performing the processing of step S5 or step S22 is the same as the processing illustrated in FIG. 4.

Thus, according to Embodiment 2, it is possible to obtain substantially the same effects as in the foregoing Embodiment 1. Furthermore, since it is not necessary to vary the cycles of the vertical synchronization signals VD and the cycles can be made a constant cycle, a configuration of a circuit for generating a pulse in the synchronizing signal generation portion 3 can be simplified and control of the synchronizing signal generation portion 3 can also be simplified.

Further, since a configuration is adopted that drives the image pickup device in the second driving mode when an image-pickup frame rate is greater than or equal to a predetermined frame rate (for example, 120 fps), or when an exposure time of a long exposure is less than a predetermined time (when the exposure time of the long exposure is less than a predetermined proportion of the vertical synchronization period), it is also possible to generate the read-out start pulse based on the vertical synchronization signal VD, and thus control of the drive portion 4 can be further simplified without making unnaturalness of a synthesized wide dynamic range moving image conspicuous.

Although the above description focuses mainly on the image pickup apparatus and the image pickup system, naturally the present invention may be applied with respect to an image pickup method or an image pickup program that implements the same functions, or to a recording medium or the like that records the image pickup program.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus that performs an image pickup operation that can synthesize image data of a wide dynamic range by alternately repeating a long exposure and a short exposure, comprising:
   an image pickup device in which a plurality of pixels are arranged; and
   a timing control portion that drives the image pickup device in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e, wherein:
   the timing control portion drives the image pickup device so as to perform the short exposure and the long exposure one time each in two consecutive vertical synchronization periods that are defined by three consecutive vertical synchronization signals; and
   the time interval e is expressed by $e=(a-b-c)/2$ where, a represents a total period of two consecutive vertical synchronization periods, b represents an exposure time of the short exposure, and c represents the exposure time of the long exposure.

2. The image pickup apparatus according to claim 1, wherein the timing control portion further controls a cycle of the vertical synchronization signal so that the first time interval and the second time interval equally become the time interval e under a limitation that both a time from generation of the vertical synchronization signal until starting readout of a signal of a pixel in the short exposure and a time from generation of the vertical synchronization signal until starting readout of the signal of the pixel in the long exposure are made a fixed time period that is previously set.

3. The image pickup apparatus according to claim 1, wherein, under a limitation that a cycle of the vertical synchronization signal is a constant cycle, the timing control portion further controls a time from generation of the vertical synchronization signal until starting readout of a signal of a pixel in the short exposure and a time from generation of the vertical synchronization signal until starting readout of the signal of the pixel in the long exposure so that the first time interval and the second time interval equally become the time interval e.

4. The image pickup apparatus according to claim 1, further comprising a synthesis processing portion that processes two pieces of image data obtained by the long exposure and the short exposure that are performed at timings that occur in succession, and synthesizes image data of a wide dynamic range.

5. An image pickup apparatus that performs an image pickup operation that can synthesize image data of a wide dynamic range by alternately repeating a long exposure and a short exposure, comprising:
an image pickup device in which a plurality of pixels are arranged; and
a timing control portion that drives the image pickup device in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e, wherein, in addition to the first driving mode, the timing control portion can also drive the image pickup device in a second driving mode that satisfies both a limitation that a cycle of a vertical synchronization signal is a constant cycle and a limitation that both a time from generation of the vertical synchronization signal until starting readout of a signal of a pixel in the short exposure and a time from generation of the vertical synchronization signal until starting readout of the signal of the pixel in the long exposure are made a fixed time period that is previously set, and the timing control portion drives the image pickup device in the first driving mode when an image-pickup frame rate that is a number of the vertical synchronization signals generated in a unit time is less than a predetermined frame rate and drives the image pickup device in the second driving mode when the image-pickup frame rate is greater than or equal to the predetermined frame rate.

6. The image pickup apparatus according to claim 5, wherein the predetermined frame rate is 120 fps.

7. An image pickup apparatus that performs an image pickup operation that can synthesize image data of a wide dynamic range by alternately repeating a long exposure and a short exposure, comprising:
an image pickup device in which a plurality of pixels are arranged; and
a timing control portion that drives the image pickup device in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e, wherein, in addition to the first driving mode, the timing control portion can also drive the image pickup device in a second driving mode that satisfies both a limitation that a cycle of a vertical synchronization signal is a constant cycle and a limitation that both a time from generation of the vertical synchronization signal until starting readout of a signal of a pixel in the short exposure and a time from generation of the vertical synchronization signal until starting readout of the signal of the pixel in the long exposure are made a fixed time period that is previously set, and the timing control portion drives the image pickup device in the first driving mode when an exposure time of the long exposure is greater than or equal to a predetermined proportion of a vertical synchronization period and drives the image pickup device in the second driving mode when the exposure time of the long exposure is less than a predetermined proportion of the vertical synchronization period.

8. An image pickup system, comprising:
an image pickup apparatus that performs an image pickup operation that can synthesize image data of a wide dynamic range by alternately repeating a long exposure and a short exposure, the image pickup apparatus including
an image pickup device in which a plurality of pixels are arranged, and
a timing control portion that drives the image pickup device in a first driving mode that makes a first time interval between an exposure end time of a pixel in a short exposure and an exposure start time of the pixel in a long exposure immediately thereafter and a second time interval between an exposure end time of the pixel in the long exposure and an exposure start time of the pixel in a short exposure immediately thereafter equally a time interval e,
wherein the timing control portion drives the image pickup device so as to perform the short exposure and the long exposure one time each in two consecutive vertical synchronization periods that are defined by three consecutive vertical synchronization signals, and
wherein the time interval e is expressed by $$e = (a-b-c)/2$$

where, a represents a total period of two consecutive vertical synchronization periods, b represents an exposure time of the short exposure, and c represents the exposure time of the long exposure; and
a synthesis processing portion that processes two pieces of image data obtained by a long exposure and a short exposure that are performed at timings that occur in succession by the image pickup apparatus, and synthesizes image data of a wide dynamic range.

9. An image pickup method that performs an image pickup operation that can synthesize image data of a wide dynamic range by alternately repeating a long exposure and a short exposure, comprising:
a step of performing a long exposure by means of an image pickup device in which a plurality of pixels are arranged; and
a step of performing a short exposure by means of the image pickup device;
wherein, by means of a timing control portion driving the image pickup device, the method alternately repeats the step of performing the long exposure and the step of performing the short exposure in a first driving mode that makes a first time interval between an exposure end time of a pixel in the short exposure and an exposure start time of the pixel in the long exposure immediately thereafter and a second time interval between the exposure end time of the pixel in the long exposure and the exposure start time of the pixel in the short exposure immediately thereafter equally a time interval e,
wherein the timing control portion drives the image pickup device so as to perform the short exposure and the long exposure one time each in two consecutive vertical synchronization periods that are defined by three consecutive vertical synchronization signals, and
wherein the time interval e is expressed by $$e=(a-b-c)/2$$

where, a represents a total period of two consecutive vertical synchronization periods, b represents an exposure time of the short exposure, and c represents the exposure time of the long exposure.

* * * * *